(12) United States Patent
Mochida

(10) Patent No.: US 6,845,666 B2
(45) Date of Patent: Jan. 25, 2005

(54) ANGULAR VELOCITY SENSOR

(75) Inventor: Yoichi Mochida, Fujisawa (JP)

(73) Assignee: Murata Manufacturing Co., Ltd., Kyoto (JP)

(*) Notice: Subject to any disclaimer, the term of this patent is extended or adjusted under 35 U.S.C. 154(b) by 69 days.

(21) Appl. No.: 09/753,371

(22) Filed: Jan. 2, 2001

(65) Prior Publication Data
US 2001/0008087 A1 Jul. 19, 2001

(30) Foreign Application Priority Data

Jan. 14, 2000 (JP) ........................................ 2000-007095

(51) Int. Cl.[7] .............................................. G01P 15/00
(52) U.S. Cl. ................................ 73/504.12; 73/504.03
(58) Field of Search ........................ 73/504.12, 504.02, 73/514.02, 514.01, 514.23, 511, 504.03, 504.04

(56) References Cited

U.S. PATENT DOCUMENTS 5,610,334 A * 3/1997 Fima et al. ............... 73/504.12
6,009,751 A * 1/2000 Ljung ....................... 73/504.02
6,134,961 A * 10/2000 Touge et al. ............. 73/504.04

FOREIGN PATENT DOCUMENTS

| JP | 9-512106 | 12/1997 |
| JP | 11-325915 | 11/1999 |
| JP | 2001-133268 | 5/2001 |

* cited by examiner

Primary Examiner—Hezron Williams
Assistant Examiner—Jacques M. Saint-Surin
(74) Attorney, Agent, or Firm—Keating & Bennett, LLP

(57) ABSTRACT

An angular velocity sensor includes a substrate; an impact damping mechanism disposed on the substrate for damping an impact applied to the substrate; an oscillator supported to the inside of the impact damping mechanism displaceable in two directions parallel to the substrate and orthogonal to each other by using an oscillator support beam; oscillation-generating means for oscillating the oscillator in an oscillating direction; and angular-velocity detecting means for detecting a displacement of the oscillator as an angular velocity when the oscillator is displaced in a detecting direction orthogonal to the oscillating direction. The impact damping mechanism damps an impact along at least one direction of the oscillating direction and the detecting direction so as to prevent the impact from being transferred to the oscillator from the substrate.

10 Claims, 5 Drawing Sheets

ANGULAR VELOCITY SENSOR

BACKGROUND OF THE INVENTION

1. Field of the Invention

The present invention relates to an angular velocity sensor suitable for use in detecting an angular velocity of, for example, a rotator.

2. Description of the Related Art

An angular velocity sensor is generally known, which comprises a substrate, an oscillator displaceably supported by the substrate via an oscillator-support beam in two directions orthogonal to each other, oscillation-generating means for oscillating the oscillator in one of two directions parallel to the substrate (i.e., an X-axis direction or a Y-axis direction), and an angular-velocity detecting means for detecting the displacement of the oscillator as an angular velocity when the oscillator is displaced in the other of the two directions (Japanese Unexamined Patent Application Publication No. 11-325915, for example).

If, while an oscillation about the X axis, for example, is provided to the oscillator, and an angular velocity about a Z axis orthogonal to X and Y axes is applied from the exterior, a Coriolis force (inertial force) acts upon the oscillator and causes the oscillator to be displaced in the Y axis direction. The angular-velocity detecting means detects the displacement of the oscillator in the Y axis direction due to the Coriolis force as changes in an output or in static capacity of a piezoelectric body, etc.

In a conventional technique, a frame-shaped member surrounding the oscillator is provided on the substrate, and by supporting the oscillator with the frame-shaped member via an oscillator-support beam, the effect on the oscillator by changes in the characteristics of the oscillator-support beam, etc., due to temperature changes is reduced so as to stabilize the oscillating state, resulting in improving detection accuracies.

In the above-mentioned conventional technique, by maintaining the oscillator in a stabilized oscillating condition relative to the X axis direction, a displacement of the oscillator when it is displaced in the Y axis direction due to a Coriolis force is detected as an angular velocity.

However, not only an angular velocity may be applied from a rotator attached thereto, etc., but also an eternal force may be applied to the rotator, or an inertial force due to changes in movement may be applied thereto, with an impact which is then applied to the oscillator via the oscillator-support beam, etc.

In this case, when waveforms of the impact include an oscillation having a frequency close to a resonant frequency of the oscillator, the oscillator may resonate sufficiently due to the impact so that the oscillating state becomes unstable or the oscillator is displaced in the detecting direction regardless of the Coriolis force.

Therefore, the conventional technique has a problem that when an impact is applied from the exterior, changes in detecting sensitivity for an angular velocity and errors in detecting values are prone to occur, resulting in degrading of the reliability as a sensor.

Also, in the conventional technique, the frame-shaped member for supporting the oscillator is provided on the substrate; however, the frame-shaped member only serves to reduce the effect due to temperature changes and it does not abate the impact transmitted to the oscillator from the substrate.

SUMMARY OF THE INVENTION

In view of the above-mentioned problems of the conventional technique, the present invention has been made, and it is an object of the present invention to provide an angular velocity sensor capable of damping the impact applied to the oscillator from a substrate so as to restrain the impact from transferring to the oscillator so that detecting sensitivity and detecting accuracies can be stabilized while the reliability can be improved.

In order to solve the above-mentioned problems, the angular velocity sensor comprises: a substrate; an oscillator disposed on the substrate so as to be displaceable relative to the substrate; and an impact damping mechanism disposed on the substrate for dampening the effect on oscillating of the oscillator from impact to the substrate.

In accordance with an aspect of the invention, the angular velocity sensor comprises: a substrate; an impact damping mechanism disposed on the substrate for damping an impact applied to the substrate; an oscillator supported on the inside of the impact damping mechanism displaceable in two directions parallel to the substrate; and orthogonal to each other by using an oscillator support beam. Oscillation-generating means are provided for oscillating the oscillator in an oscillating direction parallel to the substrate of the two directions; and angular-velocity detecting means are provided for detecting a displacement of the oscillator as an angular velocity when the oscillator is displaced in a detecting direction orthogonal to the oscillating direction. The impact damping mechanism damps an impact along at least one direction of the oscillating direction and the detecting direction so as to prevent the impact from being transferred to the oscillator from the substrate.

By forming the sensor as above, the oscillator can be displaced in the detecting direction corresponding to an angular velocity applied to the substrate in an oscillating state in a predetermined oscillating direction by the oscillation-generating means while the angular-velocity detecting means can detect the displacement of the oscillator as the angular velocity. Also, when an impact is applied to the substrate from the exterior along the oscillating direction or the detecting direction, the impact is damped by the impact damping mechanism. As a result, the oscillator can be maintained in a substantially stable oscillating state against an impact and it can be prevented from being displaced by an impact in the detecting direction.

The impact damping mechanism may be formed of a frame support beam disposed in the substrate and a frame supported to the substrate by the frame support beam displaceable in at least one direction of the oscillating direction and the detecting direction, and wherein the oscillator is supported to the inside of the frame via the oscillator support beam displaceable in both the oscillating direction and the detecting direction.

Due to this structure, when an impact is applied to the substrate from the exterior, the impact can be damped to the outside of the oscillator by the frame support beam and the frame and can be prevented from being transferred to the oscillator. Also, since the oscillator is supported within the frame by the oscillator support beam, the oscillator can be displaced corresponding to an angular velocity while oscillating in this state.

An entire resonant frequency of the oscillator, the oscillator support beam and the frame may be set to be $1/\sqrt{2}$ times more than or less than the oscillator resonant frequency.

Due to this structure, when an impact having a waveform close to the resonant frequency of the oscillator is applied to the substrate, the entire frame section including the oscillator and the oscillator support beam can be substantially prevented from being oscillated by the impact, so that the impact waveform having a large effect on the oscillator can be especially damped.

Further, the substrate may be provided with a support section arranged outside the frame so as to surround the frame for supporting the frame via the frame support beam and a damping clearance portion constituting a part of the impact damping mechanism is arranged between the support section and the frame for compressing gas when the frame is displaced.

Due to this structure, gas such as air sealed into a package of the angular velocity sensor exists in the damping clearance portions, for example, so that the gas has a damping function. When an impact is applied to the substrate from the exterior, the entire frame section including the oscillator and the oscillator support beam is oscillated by the impact, so that the gas within the damping clearance portions is compressed against the substrate by the frame or the frame support beam, and the oscillation of the frame is thereby damped by the gas.

The oscillator may be formed to be displaceable in an oscillating direction parallel to the substrate and in a detecting direction orthogonal to the substrate, and the impact damping mechanism may be formed so as to damp an impact in the oscillating direction and to prevent the impact from being transferred to the oscillator from the substrate.

Due to this structure, while the oscillator is oscillated along a plane parallel to the substrate, the oscillator can be displaced in the detecting direction orthogonal to this plane corresponding to an angular velocity, and the impact damping mechanism can damp an impact applied to the substrate along the oscillation direction.

The oscillator may by formed to be displaceable in oscillating and detecting directions parallel to the substrate and orthogonal to each other, and the impact damping mechanism may be formed so as to damp an impact in at least one direction of the oscillating and detecting directions and to prevent the impact from being transferred to the oscillator from the substrate.

Due to the structure, while the oscillator is oscillated along a plane parallel to the substrate, it can be displaced in the detecting direction along the plane corresponding to an angular velocity, and the impact damping mechanism can damp an impact applied to the substrate along at least one of the oscillating and detecting directions.

Furthermore, the oscillator, the oscillator support beam, and the impact damping mechanism may be unitarily formed by a single-crystalline or polycrystalline silicon material having a low resistance.

Due to the structure, by microembossing such as etching a single-crystalline or polycrystalline silicon material, the oscillator, the oscillator support beam, and the impact damping mechanism can be simultaneously formed efficiently.

For the purpose of illustrating the invention, there is shown in the drawings several forms which are presently preferred, it being understood, however, that the invention is not limited to the precise arrangements and instrumentalities shown.

Other features and advantages of the present invention will become apparent from the following description of the invention which refers to the accompanying drawings.

DETAILED DESCRIPTION OF PREFERRED EMBODIMENTS

Figure 1:
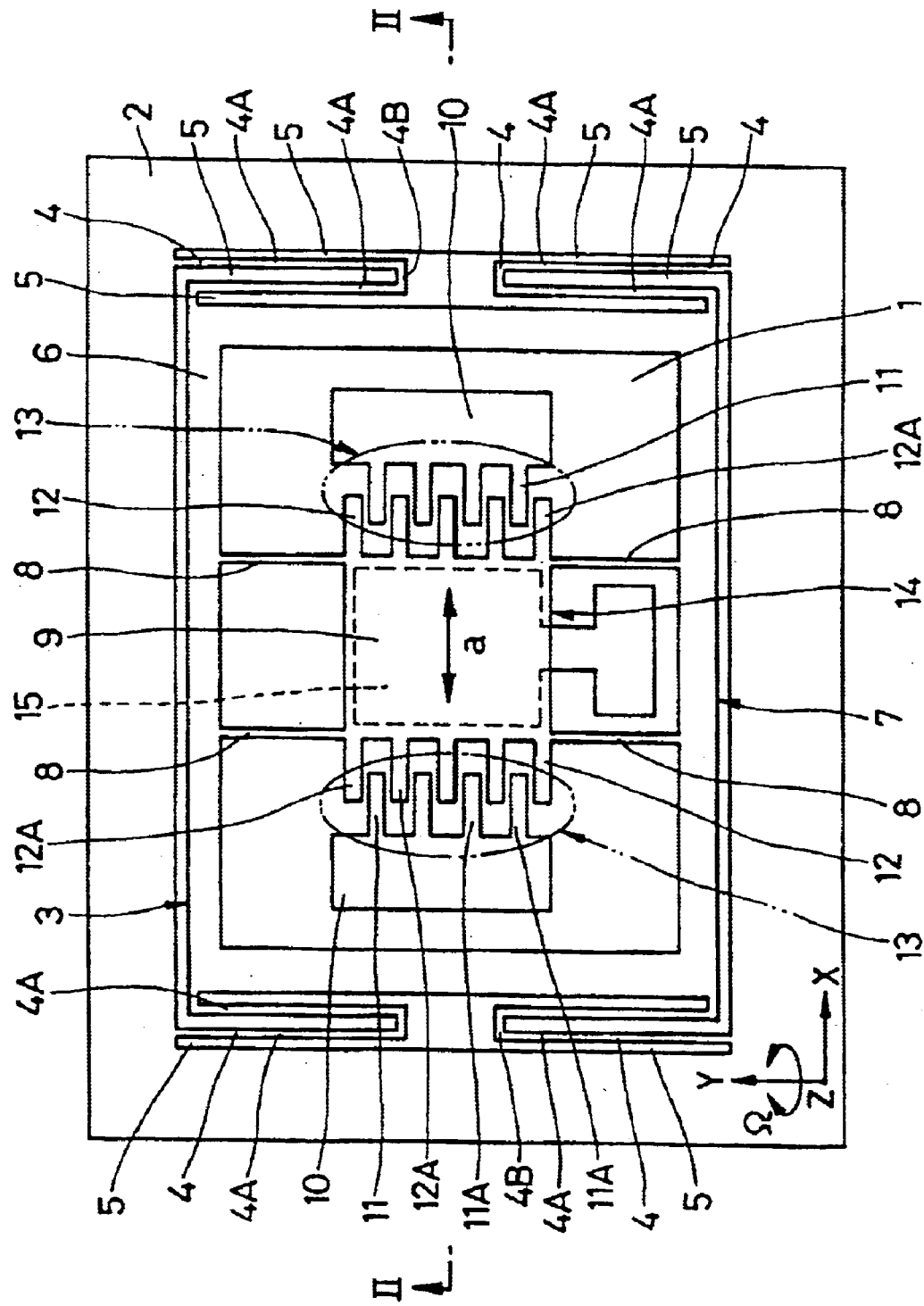
FIG. 1 is a plan view of an angular velocity sensor according to a first embodiment of the present invention.

Hereinafter, the preferred embodiments of the present invention are explained in detail with reference to the drawings.

An angular velocity sensor according to embodiments of the present invention will be described in detail below with reference to FIGS. 1 to 6.

FIGS. 1 to 4 show a first embodiment of the present invention, wherein numeral 1 denotes a rectangular substrate forming a body of an angular velocity sensor and made of a silicon material having a high resistance, a glass material, or the like.

Numeral 2 denotes a support section fixedly arranged on the substrate 1. The support section 2 is formed as a rectangular frame surrounding an inner frame 6 and an oscillator 9, which will be described later, etc.

Numeral 3 denotes an impact damping mechanism arranged between the support section 2 and the oscillator 9 and which is formed of four frame-support beams 4, 4, . . . , which will be described later.

The frame-support beams 4, 4 . . . are disposed between the support section 2 and the frame 6. A pair of the frame-support beams are arranged at each of the lateral sides of the frame 6 relative to the X axial direction shown in FIG. 1. Each frame-support beam 4 is formed of extending portions 4A and 4A in the Y axial direction and connecting portion 4B for connecting each extending portion 4A in a reversed U-shape state. Each extending portion 4A is located between the support section 2 and the frame 6 and forms a small clearance portion 5 for providing cushioning in the X axial direction. In these clearance portions 5, gas such as air sealed into a package (not shown) of the angular velocity sensor exists, and each clearance portion for cushioning compresses the gas when the frame 6 is displaced in the X axial direction.

The frame 6 is formed to have a rectangular shape surrounding oscillator-support beams 8, 8, . . . and the oscillator 9, which will be described later. The frame 6 is supported by each frame-support beam 4 so as to be displaceable in the X axial direction in a spaced state from the top surface of the substrate 1.

The frame 6, each oscillator-support beam 8, and the oscillator 9 form an entire mass section 7 oscillatably supported to each frame-support beam 4 in the X axial direction. The entire mass section 7 has a predetermined entire resonant frequency $\omega_0$. The entire resonant frequency $\omega_0$ is set by adjusting a mass of the frame 6 or a spring coefficient of each frame-support beam 4, for example, and has a relationship relative to a resonant frequency $\omega_1$ of the oscillator 9 indicated by the following numerical equation 1.
Numerical Equation 1

$$\omega_0 \leq \frac{\omega_1}{\sqrt{2}}$$

Thereby, when an impact is applied to the substrate 1 in the X axial direction from the exterior, the frame 6 efficiently dampens the impact so as to prevent it from transferring to the oscillator 9 from the substrate in association with each frame-support beam 4.

Each oscillator-support beam 8 is formed extending in the Y axial direction shown in FIG. 1. Two of the oscillator-support beams 8 and 8 are arranged at front and rear sides of each side of the oscillator 9 relative to the Y axial direction, i.e., there are four of them in total sandwiching the oscillator 9.

The oscillator 9 is substantially square in shape and is formed by microembossing such as etching a single-crystalline or polycrystalline silicon material having a low resistance simultaneously together with the support section 2, the support beams 4 and 8, the frame 6, and oscillation fixing sections 10/electrodes 11 and 12 which will be described later.

The oscillator 9 is supported by each oscillator-support beam 8 so as to be displaceable in the X and Z axial directions in a spaced state from the substrate 1. The oscillator 9 is oscillated in the direction indicated by arrow a in FIG. 1 within the frame 6 by oscillation-generating sections 13, which will be described later, so as to oscillate at the resonant frequency $\omega_1$ in the X axial direction.

The two oscillation fixing sections 10 are fixedly disposed on the substrate 1. Each oscillation fixing section 10 is respectively arranged at both lateral sides in the X-axial direction of the oscillator 9.

The stationary-part oscillation electrodes 11 are disposed in each oscillation fixing section 10. Each stationary-part oscillation electrode 11 is formed to have plural electrode plates 11A, 11A, . . . projecting toward moving-part oscillation electrodes 12 which will be described later.

The moving-part oscillation electrodes 12 are disposed at lateral sides of the oscillator 9. Each moving-part oscillation electrode 12 has plural electrode plates 12A, 12A, . . . alternately arranged so as to mesh with each electrode plate 11A of the stationary-part oscillation electrode 11. Between the electrode plates 11A and 12A, a small clearance portion is formed in the Y axial direction. The mass of each moving-part oscillation electrode 12 constitutes part of the mass of the oscillator 9.

Numerals 13 and 13 denote right and left oscillation-generating sections serving as oscillation-generating means. Each oscillation-generating section 13 is formed of one of the stationary-part oscillation electrodes 11 and one of the moving-part oscillation electrode 12. Oscillation drive signals such as pulse waves and sine waves 180° out of phase with each other and having a frequency corresponding to the resonant frequency $\omega_1$ of the oscillator 9 are applied to the electrodes 11 and 12, respectively, so that the right and left oscillation-generating sections 13 alternately apply electrostatic attractive forces in the right and left directions to the oscillator 9, thereby oscillating the oscillator 9 in the x axial direction at the resonant frequency $\omega_1$.

Figure 2:
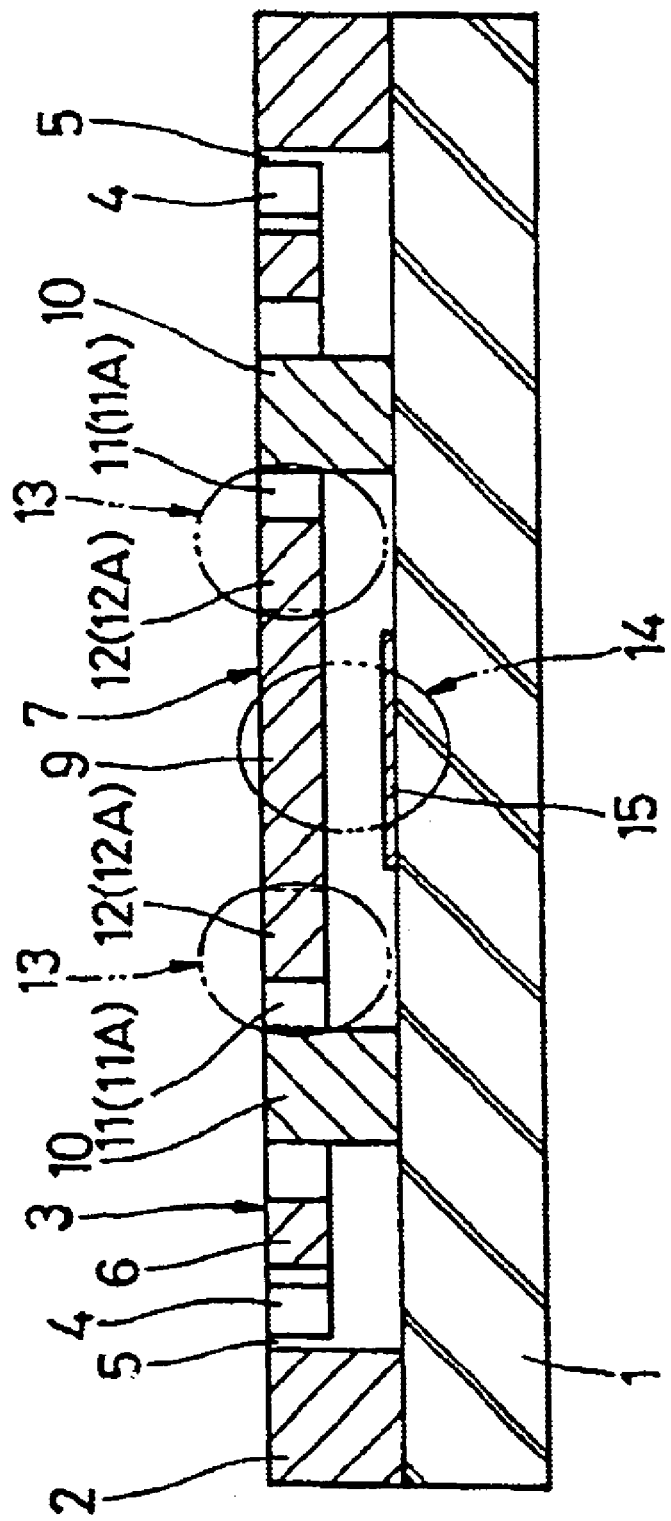
FIG. 2 is a longitudinal sectional view of the angular velocity sensor at the line II—II viewed in the arrow direction in FIG. 1.

Numeral 14 denotes an angular-velocity detecting section serving as angular-velocity detecting means. As best seen in FIG. 2, the angular-velocity detecting section 14 is formed of a stationary-part detection electrode 15 disposed on the substrate 1. The oscillator 9 opposes the stationary-part detection electrode 15 via a clearance portion in the Z axial direction, and the oscillator 9 and the electrode 13 constitute a parallel-plate capacitor.

The angular-velocity detecting section 14 obtains a displacement in the Z axial direction as the detecting direction when the oscillator 9 is displaced in the Z axial direction by detecting changes in electrostatic capacity between the oscillator 9 and the stationary-part detection electrode 15 so as to output a detection signal corresponding to an angular velocity about the Y axis.

The angular velocity sensor according to the embodiment of the present invention has the above-mentioned structure; next, operation thereof will be described.

When a drive signal (not shown) having an opposite phase to a bias voltage is applied to the right and left oscillation-generating sections 13, electrostatic attractive forces are alternately applied to the oscillator 9 toward the right or the left from each oscillation-generating section 13 along the X axial direction, thereby oscillating the oscillator 9 within the frame 6 in the direction indicated by arrow a in FIG. 1 at the resonant frequency $\omega_1$.

If an angular velocity $\Omega$ about the Y axial direction is added in this resonant state, a Coriolis force (inertial force) F shown in the following numerical equation 2, is applied to the oscillator 9 along the Z axial direction, so that the oscillator 9 is displaced by the Coriolis force F in the Z axial direction.

Numerical Equation 2

$$F = 2 m \Omega v$$

wherein in: a mass of the oscillator 9

$\Omega$: an angular velocity about the Y axial direction v: a velocity of the oscillator 9 in the X axial direction When the oscillator 9 is displaced in the Z axial direction, the size of the clearance portion between the oscillator 9 and the stationary-part detection electrode 15 is changed corresponding to the displacement, so that the angular-velocity detecting section 14 detects a change in electrostatic capacity corresponding to the size in the clearance portion between the oscillator 9 and the stationary-part detection electrode 15 as an angular velocity so as to output a detection signal corresponding to the angular velocity $\Omega$.

When an impact in the X axial direction is applied to the angular velocity sensor, since the impact damping mechanism 3 lies between the substrate 1 and the oscillator 9, the impact is damped by each frame-support beam 4 and the frame 6 thereof, thereby suppressing the effect on the oscillator 9 as will be described later.

Figure 3:
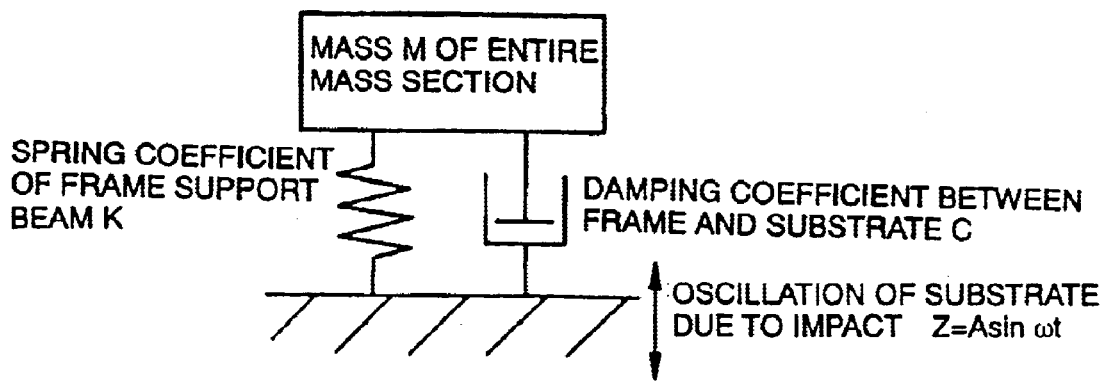
FIG. 3 is a schematic representation showing a dynamic model of a substrate and an entire mass section.

The action damping the impact will be described by using a dynamic model shown in FIG. 3 of the angular velocity sensor.

A waveform of the impact applied to the substrate 1 is represented by the following numerical equation 3 using an amplitude A, a frequency $\omega$, a displacement z, and a time t.

Numerical Equation 3

$$z = A \sin(\omega t)$$

When the impact following the numerical equation 3 is applied to the substrate 1, the equation of motion of the entire mass section 7 is represented by the following numerical equation 4.

Numerical Equation 4

$$M\ddot{x} + C\dot{x} + kx = C\dot{z} + kz$$

wherein M: a mass of the entire mass section 7
C: a damping coefficient of each frame-support beam 4, etc., on the oscillation of the frame 6
K: a spring coefficient of the entire frame-support beams 4
A: an amplitude of an impact waveform applied to the substrate 1
X: a displacement of the entire mass section 7

Figure 4:
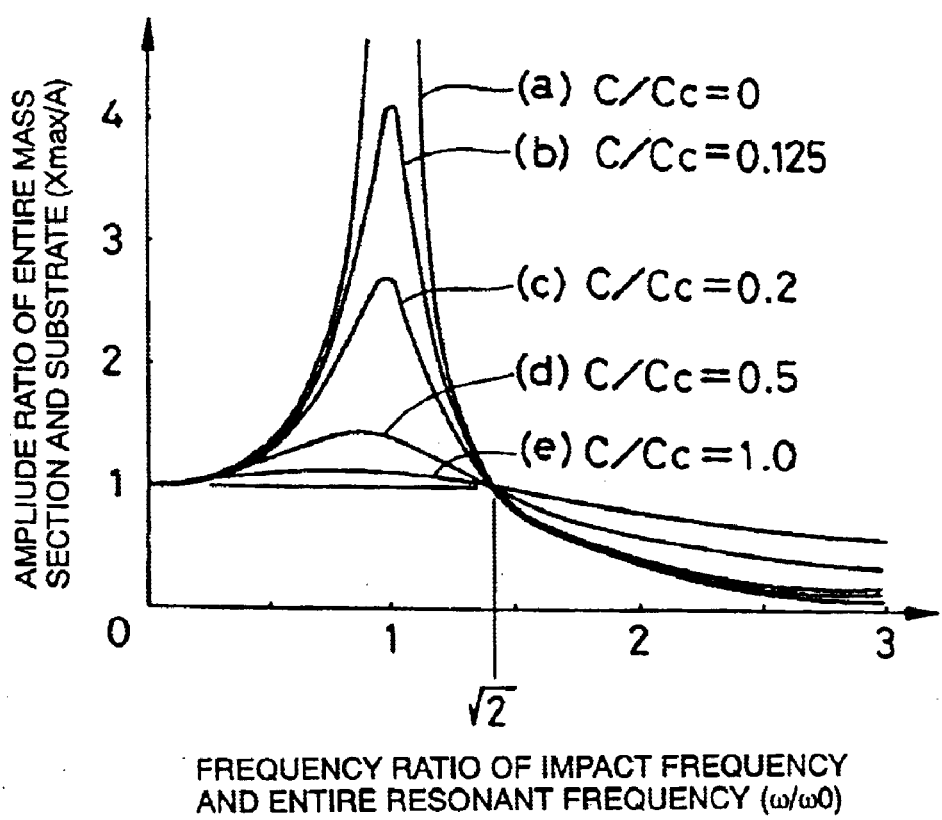
FIG. 4 is a characteristic diagram showing the relationship between a frequency ratio corresponding to a frequency of an impact waveform and an amplitude ratio corresponding to an amplitude of the entire mass section.

By solving the motion equation shown in the numerical equation 4, an amplitude ratio (xmax/A) of the maximum displacement (amplitude) xmax of the entire mass section 7 relative to the amplitude A in the side of the substrate 1 is obtained, it is as shown in FIG. 4. In this case, in FIG. 4, the axis of abscissa shows a frequency ratio ($\omega/\omega_0$) of the frequency $\omega$ of the impact waveform relative to the resonant frequency $\omega_0$ of the entire mass section 7. Also, characteristic curves (a), (b), (c), (d), and (e) respectively show amplitude ratios (xmax/A) in cases having a different damping coefficient C, which will be described later.

As will be understood from FIG. 4, when the frequency $\omega$ of the impact waveform applied to the substrate 1 is larger than the resonant frequency $\omega_0$ of the entire mass section 7 so that the frequency ratio ($\omega/\omega_0$) becomes larger than 1, the amplitude ratios (xmax/A) decrease in all the characteristic curves (a) to (e). In particular, when the frequency ratio ($\omega/\omega_0$) becomes larger than $\sqrt{2}$, the amplitude xmax of the entire mass section 7 is extremely decreased, thereby efficiently damping the impact transformed to the oscillator 9.

As a result, even when an impact having waveforms close to the resonant frequency $\omega_1$ of the oscillator 9 is applied to the substrate 1, the oscillation (amplitude xmax) of the entire mass section 7 can be suppressed to be small by previously setting the frequency ratio ($\omega_1/\omega_0$) of the resonant frequency $\omega_1$ and the resonant frequency $\omega_0$ of the entire mass section 7 to be larger than $\sqrt{2}$ as shown in the following numerical equation 5.

Numerical Equation 5

$$\sqrt{2} \leq \frac{\omega_1}{\omega_0}$$

Therefore, by adjusting the mass of the frame 6 or the spring coefficient of each frame-support beam 4, etc., for example, as shown in the numerical equation 1 modified from the numerical equation 5, the frequency ratio ($\omega_1/\omega_0$) is previously set to be larger than $\sqrt{2}$, so that any impact can be efficiently damped from transmitting to the oscillator 9 even when an impact having a large effect on the oscillator 9 because it has a frequency close to the resonant frequency $\omega$ is applied to the substrate 1.

On the other hand, the characteristic curves (a) to (e) in FIG. 4 show the amplitude ratios (xmax/A) when a damping coefficient of each frame-support beam 4, etc., is changed relative to a predetermined critical damping coefficient $C_c$. In this case, when a coefficient ratio ($C/C_c$) is reduced by setting the damping coefficient C to be small, like in the characteristic curve (b), for example, in the frequency region where the frequency ratio ($\omega_1/\omega_0$) is $\sqrt{2}$ or more, the amplitude xmax of the entire mass section 7 can be more efficiently damped compared with those of other characteristic curves (c) to (e) having larger damping coefficients C. However, in the frequency region where the frequency ratio ($\omega_1/\omega_0$) is less than $\sqrt{2}$, the amplitude xmax of the entire mass section 7 is increased.

Therefore, in the embodiment of FIGS. 1 and 2, small damping clearance portions 5 are arranged between the support section 2 of the substrate 1 and the frame 6, so that the damping coefficient C of the entire mass section 7 is properly adjusted by the damping function of the damping clearance portion 5 including the gas therein.

Accordingly, when the entire mass section 7 is oscillated by an impact in the X axial direction, since the gas within each damping clearance portion 5 is compressed against the support section 2 by the frame 6 or the extending portion 4A of each frame-support beam 4, the gas serves as a damper so as to give a proper damping coefficient C to the oscillation of the entire mass section 7.

In such a manner, in the embodiment of FIGS. 1 and 2, the impact damping mechanism 3 is arranged between the substrate 1 and the oscillator 9, so that when an impact is applied to the substrate 1 along the oscillating direction of the oscillator 9, the impact can be securely damped by the impact damping mechanism 3 so as to suppress the impact from being transferred to the oscillator 9. Thereby, the oscillation-generating section 13 can steadily oscillate the oscillator 9 against an impact from the exterior, resulting in improving detecting sensitivity and detecting accuracy of the sensor while increasing reliability.

Since the impact damping mechanism 3 is formed of each frame-support beam 4 and the frame 6, and the resonant frequency $\omega_0$ of the entire mass section 7 including the frame 6 is set to be $1/\sqrt{2}$ times as much as or less than the resonant frequency $\omega_1$ of the oscillator 9, when an impact is applied to the substrate 1, the impact can be damped by each frame-support beam 4 and the frame 6 in the outside of the oscillator 9. In particular, the oscillation of the entire mass section 7 can be suppressed to be small against an impact waveform having a frequency close to the resonant frequency $\omega_1$ of the oscillator 9 while the efficiency damping of such an impact waveform having a large effect on the oscillator 9 can be improved.

Also, the damping clearance portions 5 where 4 are arranged so that when the frame 6 is oscillated by an impact in the X axial direction, the gas within each damping clearance portion 5 as a damper can give a proper damping coefficient C to the oscillation of the entire mass section 7. For example, by changing sizes and shapes, etc., in the frame-support beams 4 and the damping clearance portions 5, the damping coefficient C can be easily adjusted while the damping efficiency of the impact can be further improved.

Figure 5:
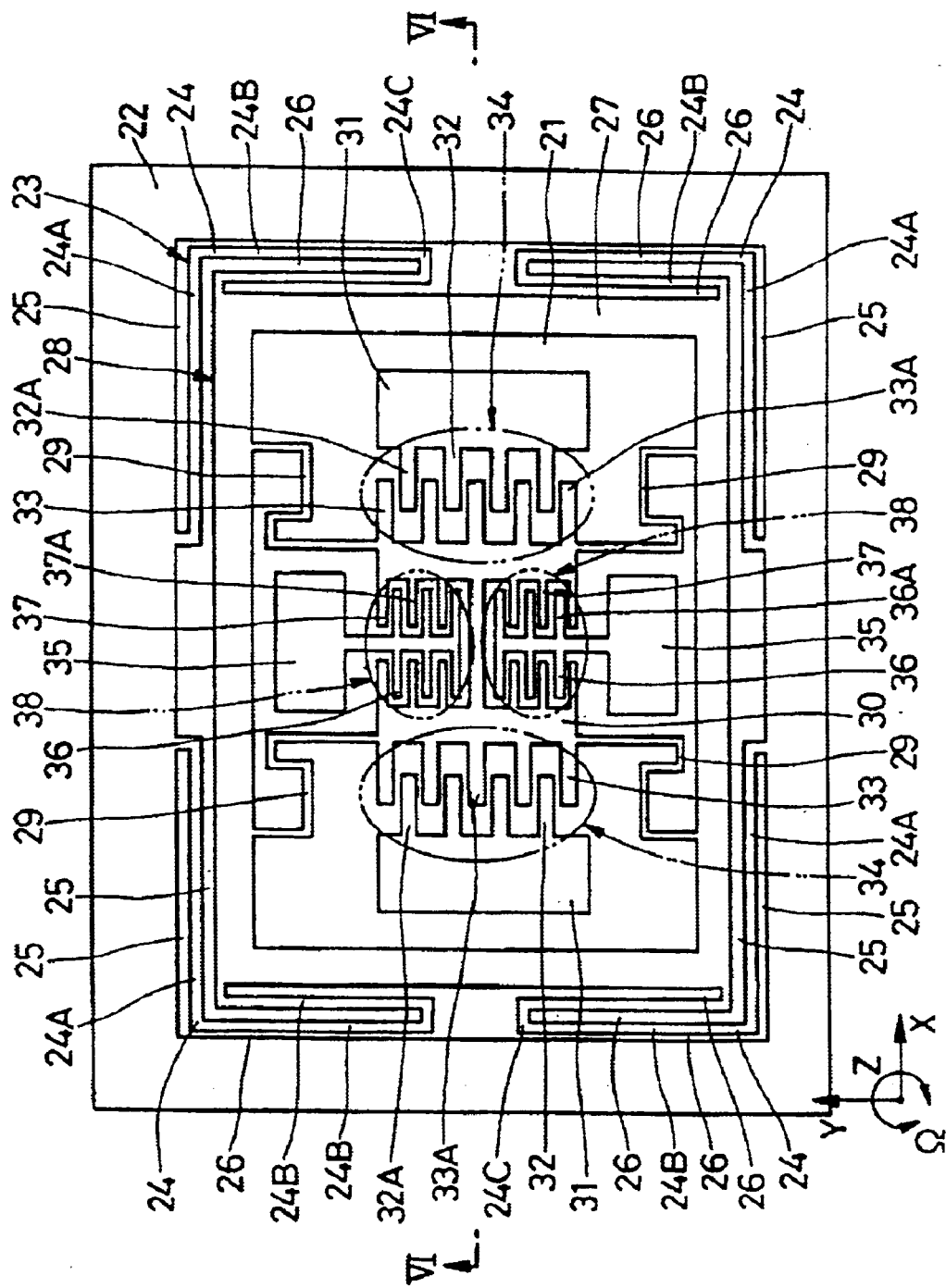
FIG. 5 is a plan view of an angular velocity sensor according to a second embodiment of the present invention.
Figure 6:
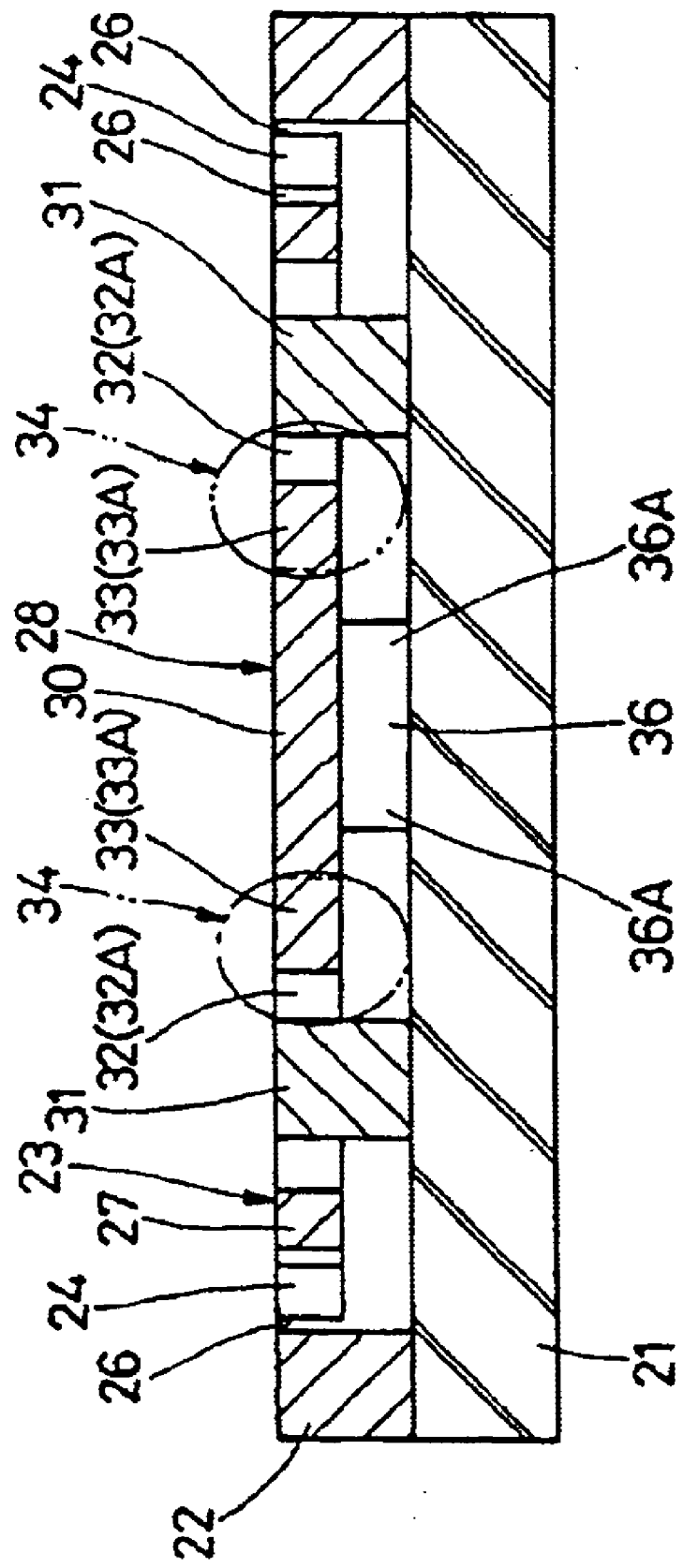
FIG. 6 a longitudinal sectional view of the angular velocity sensor at the line VI—VI viewed in the arrow direction in FIG. 5.

Next, FIGS. 5 and 6 show a second embodiment of the present invention. The feature of the second embodiment is that impacts applied to the angular velocity sensor in both oscillating and detecting directions can be damped. In addition, like reference characters designate like portions having structures common to those of the first and second embodiments, and description thereof is omitted.

Numeral 21 designates a rectangular substrate which is a body of an angular velocity sensor. Numeral 22 designates a rectangular support section fixedly arranged on the substrate 21. As shown in FIGS. 5 and 6, the support section 22 is substantially similarly formed to that in the above-mentioned first embodiment together with the substrate 21.

Numeral 23 designates an impact damping mechanism disposed between the support section 22 and an oscillator 30 which will be described later. The impact damping mechanism 23 is formed of frame-support beams 24, 24, . . . and a frame 27, which will be described later, and is substantially similarly formed to that in the first embodiment. However, the impact damping mechanism 23 according to the embodiment is formed so as to damp impacts in both the X axial and Y axial directions that are oscillating and detecting directions of the oscillator 30 as will be described later.

Each frame-support beam 24 is formed in an L shape and is arranged at each of four corners of the frame 27. The frame-support beam 24 is formed of a first extending portion 24A extending in the X axial direction in FIG. 5, of second extending portions 24B and 24B disposed in the Y axial direction at the front end of the first extending portion 24A, and a connecting portion 24C for connecting each second extending portion 24B in a reversed U-shape.

The extending portion 24A forms small damping clearance portions 25, 25 . . . in the Y axial direction located between the support section 22 and the frame 27 and having damping functions, substantially similar to the extending portion 24B forms small damping clearance portions 26, 26 . . . in the X axial direction.

Numeral 27 denotes a frame disposed between the substrate 21 and the oscillator 30. The frame 27 is extended in a rectangular shape surrounding oscillator-support beams 29, 29 . . . which will be described later, and the oscillator 30. The frame 27 is supported by each frame-support beam 24 so as to be displaceable in the X axial and Y axial directions in a spaced state from the substrate 21.

The frame 27, each oscillator-support beam 29, and the oscillator 30 form an entire mass section 28 supported by each frame-support beam 24 movable in the X axial and Y axial directions. The entire resonant frequency $\omega_2$ of the entire mass section 28 is previously set to have a relationship with the resonant frequency $\omega_3$ of the oscillator 30 shown in the following numerical equation 6 for the same reason as that in the first embodiment.

Numerical Equation 6

$$\omega_2 \leq \frac{\omega_3}{\sqrt{2}}$$

Each oscillator-support beam 29 is in the form of a long and slender plate extending in the X axial and Y axial directions shown in FIG. 5. Two of the oscillator-support beams 29 and 29 are arranged at front and rear sides at each side of the oscillator 9 relative to the Y axial direction, i.e., there are four of them in total sandwiching the oscillator 9.

The oscillator 30 is substantially H-shaped and is formed by microembossing such as etching a single-crystalline or polycrystalline silicon material having a low resistance simultaneously together with the support section 22, the support beams 24 and 29, the frame 27 and fixing sections 31 and 35/electrodes 32, 33, 36, and 37, which will be described later.

The oscillator 30 is supported by each oscillator-support beam 29 such as to be displaceably in the X and Y axial directions in a spaced state from the substrate 1 and has a predetermined oscillator-resonant-frequency $\omega_3$. The oscillator 30 is oscillated by oscillation-generating sections 34, which will be described later, so as to be oscillated within the frame 27 in the X axial direction at the resonant frequency $\omega_3$.

Numerals 31 and 31 denote two oscillation fixing sections fixedly arranged on the substrate 21. Numerals 32 and 32 denote stationary-part oscillation electrodes disposed in each oscillation fixing section 31. Each stationary-part oscillation electrode 32 is formed to have plural electrode plates 32A, 32A, . . . projecting toward moving-part oscillation electrodes 33 which will be described later.

Each moving-part oscillation electrode 33 has plural electrode plates 33A, 33A, . . . alternately arranged so as to mesh with each electrode plate 32A of the stationary-part oscillation electrode 32. Between the electrode plates 32A and 33A, a small clearance portion is formed in the Y axial direction.

Numerals 34 and 34 denote right and left oscillation-generating sections serving as oscillation-generating means. Each oscillation-generating section 34 is formed of the stationary-part oscillation electrode 32 and the moving-part oscillation electrode 33 substantially similarly to the first embodiment, and oscillates the oscillator 30 in the X axial direction at the resonant frequency $\omega_3$.

Numerals 35 and 35 denote two detection fixing sections fixedly disposed on the substrate 21. Numerals 36 and 36 denote stationary-part detection electrodes disposed in each detection fixing section 35. Each stationary-part detection electrode 36 has plural electrode plates 36A, 36A, . . . projecting toward moving-part detection electrodes 37 which will be described later.

Each moving-part detection electrode 37 has plural electrode plates 37A, 37A, . . . alternately arranged so as to mesh with each electrode plate 36A of the stationary-part detection electrode 36. Between the electrode plates 36A and 37A, a small clearance portion is formed in the Y axial direction.

Numerals 38 and 38 denote angular-velocity detecting sections serving as angular-velocity detecting means. Each angular-velocity detecting section 38 is formed of the stationary-part detection electrode 36 and the moving-part detection electrode 37, the respective electrode plates 36A and 37A thereof constituting a parallel-plate capacitor. The angular-velocity detecting section 38 obtains a displacement in the Y axial direction as the detecting direction when the oscillator 30 is displaced in the Y axial direction by detecting changes in electrostatic capacity between the stationary-part detection electrode 36 and the moving-part detection electrode 37 so as to output a detection signal corresponding to an angular velocity $\Omega$ about the Z axis.

Thereby, in the second embodiment of FIGS. 5 and 6, when the oscillator 30 oscillates in the X axial direction by being driven by each oscillation-generating section 34 and, in this state, when an angular velocity $\Omega$ about the Z axial direction is added to the angular velocity sensor, the oscillator 30 is displaced in the Y axial direction due to a Coriolis force by a displacement corresponding to an angular velocity $\Omega$. The displacement of the oscillator 30 is detected by the angular-velocity detecting section 38 as changes in electrostatic capacity so as to output a detection signal corresponding to the angular velocity $\Omega$ about the Z axis.

When an impact is applied to the substrate 21 in the X axial direction or the Y axial direction, the impact in both the directions is efficiently damped by the impact damping mechanism 23 so as to prevent the impact from transferring to the oscillator 30.

In such a manner, also in the second embodiment, a substantially similar effect to that in the first embodiment can be obtained. In particular in the second embodiment, the impact damping mechanism 23 is formed so as to damp an impact in both oscillating and detecting directions of the oscillator 30, so that the oscillator 30 is maintained in a substantially stable oscillating state against an impact in both the X axial and the Y axial direction, resulting in further improving detecting accuracies and the reliability.

Also, since the oscillator 30 is arranged to have oscillating and detecting directions in the X axial and Y axial directions parallel to the substrates, the angular velocity sensor can be miniaturized in the Z axial direction while the impact damping mechanism 23 damping an impact in both oscillating and detecting directions can be easily formed.

In addition, in the second embodiment, the oscillator 30 is displaced in the Y axial direction corresponding to an angular velocity while it is oscillating in the X axial direction, and the impact damping mechanism 23 damps an impact in both the X axial and Y axial directions; however, the present invention is not limited to these structures and the impact damping mechanism may be formed so as to damp an impact applied to the substrate 21 in either of the X axial and Y axial directions.

As described above in detail, according to the present invention, since the impact damping mechanism is provided for damping an impact along at least one direction of the oscillating and detecting directions and for preventing the impact from being transferred to the oscillator from the substrate, when an impact in the oscillating direction or the detecting direction is applied to the substrate, the impact can be securely damped by the impact damping mechanism so as to suppress the impact from being transferred to the oscillator. Thereby, while the oscillator is oscillating steadily against an impact from the exterior, the oscillator can be smoothly displaced corresponding to an angular velocity applied to the sensor. Therefore, the detecting sensitivity and detecting accuracies of the sensor can be improved so as to increase the reliability.

Since the impact damping mechanism is formed of the frame support beam and the frame, and the oscillator is supported within the frame by the oscillator support beam displaceably in both the oscillating and detecting directions, when an impact is applied to the substrate from the exterior, the impact can be damped outside the oscillator by the frame support beam and the frame so as not to be transferred to the oscillator while the oscillator can be displaced during oscillating within the frame.

Further, since the entire resonant frequency of the oscillator, the oscillator support beam, and the frame is set to be $1/\sqrt{2}$ times as much as or less than the oscillator resonant frequency, the oscillation of the oscillator, the oscillator support beam, and the entire frame section due to a waveform having a frequency close to the oscillator resonant frequency can be substantially damped so as not to be transferred to the oscillator while the damping of the impact waveform having a large effect on the oscillator can be increased.

In addition, since the damping clearance portion is arranged between the support section of the substrate and the frame for compressing gas when the frame is displaced, when the frame is oscillated by an impact, the oscillation can be properly damped by using the gas within each damping clearance portion as a damper. For example, by changing the size and the shape, etc., in the damping clearance portion, the damping coefficient can be easily adjusted while the efficiency damping an impact can be further improved.

Moreover, since the oscillator has an oscillating direction parallel to the substrate and a detecting direction orthogonal to the substrate, and since the impact damping mechanism is formed so as to damp an impact in at least one direction of the oscillating direction and the detecting direction, while the oscillator is oscillated along a plane parallel to the substrate, the oscillator can be displaced in the detecting direction orthogonal to this plane corresponding to an angular velocity, and the impact damping mechanism can damp an impact along the oscillation direction.

In addition, since the oscillating and detecting directions of the oscillator are arranged in parallel to the substrate, and the impact damping mechanism is formed so as to damp an impact along at least the detecting direction, the displacement of the oscillator in the detecting direction due to the impact can be prevented, resulting in further improving detecting accuracies and the reliability, etc. Also, by arranging the oscillating and detecting directions in parallel to the substrate, the impact damping mechanism for damping an impact along at these both directions is easily formed.

Furthermore, since the oscillator, the oscillator support beam, and the impact damping mechanism are formed by a single-crystalline or polycrystalline silicon material, by microembossing, such as etching a single-crystalline or polycrystalline silicon material, for example, the oscillator, the oscillator support beam, and the impact damping mechanism can be simultaneously formed efficiently.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. An angular velocity sensor comprising:

a substrate;

an oscillator disposed on the substrate so as to be displaceable relative to the substrate; and an impact damping mechanism disposed on the substrate for damping the effect on oscillations of the oscillator from an impact to the substrate;

a frame for supporting the oscillator;

a support member for supporting the frame;

an oscillator support beam connecting the oscillator to the frame; wherein said impact damping mechanism is defined by a single unitary member including a portion for damping in a Y-direction and a portion for damping in an X-direction which is substantially perpendicular to the Y-direction; and said single unitary member connects the frame with the support member.

2. An angular velocity sensor comprising:

a substrate;

an impact damping mechanism disposed on the substrate for damping an impact applied to the substrate;

an oscillator supported on the substrate by at least one oscillator support beam, so as to be displaceable in two directions that are substantially parallel to the substrate and substantially orthogonal to each other;

an oscillation-generating mechanism for oscillating the oscillator in an oscillating direction that is substantially parallel to one of the two directions; and an angular-velocity detecting mechanism for detecting a displacement of the oscillator as an angular velocity when the oscillator is displaced in a detecting direction that is substantially orthogonal to the oscillating direction, wherein the impact damping mechanism damps an impact to the substrate along at least one direction of the oscillating direction and the detecting direction so as to prevent the impact from being transferred to the oscillator from the substrate;

the impact damping mechanism includes a frame support beam disposed on the substrate and a frame supported on the substrate by the frame support beam so as to be displaceable in at least one of the oscillating direction and the detecting direction, and wherein the oscillator is supported on the inside of the frame via the oscillator support beam such as to be displaceable in both of the oscillating direction and the detecting direction; and the substrate is provided with a support section arranged outside the frame so as to surround the frame for supporting the frame via the frame support beam and wherein the impact damping mechanism includes a damping clearance portion arranged between the support section and the frame for compressing a gas when the frame is displaced.

3. An angular velocity sensor comprising:

a substrate;

an impact damping mechanism disposed on the substrate for damping an impact applied to the substrate;

an oscillator supported on the substrate by at least one oscillator support beam, so as to be displaceable in two directions that are substantially parallel to the substrate and substantially orthogonal to each other, an oscillation-generating mechanism for oscillating the oscillator in an oscillating direction that is substantially parallel to one of the two directions; and an angular-velocity detecting mechanism for detecting a displacement of the oscillator as an angular velocity when the oscillator is displaced in a detecting direction that is substantially orthogonal to the oscillating direction, wherein the impact damping mechanism damps an impact to the substrate along at least one direction of the oscillating direction and the detecting direction so as to prevent the impact from being transferred to the oscillator from the substrate;

the impact damping mechanism includes a frame support beam disposed on the substrate and a frame supported on the substrate by the frame support beam so as to be displaceable in at least one of the oscillating direction and the detecting direction, and wherein the oscillator is supported on the inside of the frame via the oscillator support beam so as to be displaceable in both of the oscillating direction and the detecting direction; and the oscillator, the oscillator support beam, and the frame have an entire resonant frequency which is set to be about $1/\sqrt{2}$ times as much as or less than a resonant frequency of the oscillator.

4. An angular velocity sensor according to claim 3, wherein the substrate is provided with a support section arranged outside the frame so as to surround the frame for supporting the frame via the frame support beam and wherein the impact damping mechanism includes a damping clearance portion arranged between the support section and the frame for compressing a gas when the frame is displaced.

5. An angular velocity sensor according to any one of claim 1, 2 or 3, wherein the oscillator is formed to be displaceable in an oscillating direction parallel to the substrate and in a detecting direction orthogonal to the substrate, and wherein the impact damping mechanism is formed so as to damp an impact in the oscillating direction and to prevent the impact from being transferred to the oscillator from the substrate.

6. An angular velocity sensor according to any one of claim 1, 2 or 3, wherein the oscillator is formed to be displaceable in oscillating and detecting directions parallel to the substrate and orthogonal to each other, and wherein the impact damping mechanism is formed so as to damp an impact in at least one direction of the oscillating and detecting directions and to prevent the impact from being transferred to the oscillator from the substrate.

7. An angular velocity sensor according to any one of claim 1, 2 or 3, wherein the oscillator, the oscillator support beam, and the impact damping mechanism are unitarily formed by a single-crystalline or polycrystalline silicon material.

8. An angular velocity sensor according to claim 4, wherein the oscillator, the oscillator support beam, and the impact damping mechanism are unitarily formed by a single-crystalline or polycrystalline silicon material.

9. An angular velocity sensor according to claim 5, wherein the oscillator, the oscillator support beam, and the impact damping mechanism are unitarily formed by a single-crystalline or polycrystalline silicon material.

10. An angular velocity sensor according to claim 6, wherein the oscillator, the oscillator support beam, and the impact damping mechanism are unitarily formed by a single-crystalline or polycrystalline silicon material.

* * * * *